United States Patent
Nojima

(10) Patent No.: US 7,673,156 B1
(45) Date of Patent: Mar. 2, 2010

(54) MULTIMEDIA ELECTRONIC DEVICE

(75) Inventor: Makoto Nojima, Tottori (JP)

(73) Assignees: Sanyo Electric Co., Ltd., Moriguchi-shi (JP); Tottori Sanyo Electric Co., Ltd., Tottori-shi (JP)

( * ) Notice: Subject to any disclaimer, the term of this patent is extended or adjusted under 35 U.S.C. 154(b) by 0 days.

(21) Appl. No.: 09/890,273

(22) PCT Filed: Jan. 20, 2000

(86) PCT No.: PCT/JP00/00264

§ 371 (c)(1),
(2), (4) Date: Aug. 9, 2001

(87) PCT Pub. No.: WO00/48188

PCT Pub. Date: Aug. 17, 2000

(30) Foreign Application Priority Data

Feb. 10, 1999 (JP) .................. 11-032809
Feb. 15, 1999 (JP) .................. 11-035972

(51) Int. Cl.
*G06F 1/00* (2006.01)
*G06F 1/32* (2006.01)
*G06F 3/00* (2006.01)

(52) U.S. Cl. ............................. 713/300; 713/320; 710/1
(58) Field of Classification Search ................ 713/300, 713/320; 710/14
See application file for complete search history.

(56) References Cited

U.S. PATENT DOCUMENTS

| | | | | |
|---|---|---|---|---|
| 5,884,093 A | * | 3/1999 | Berenguel et al. ............... | 710/1 |
| 6,006,285 A | * | 12/1999 | Jacobs et al. ................... | 710/14 |
| 6,006,337 A | * | 12/1999 | Koo ............................ | 713/324 |
| 6,226,237 B1 | * | 5/2001 | Chan et al. .................... | 710/14 |
| 6,279,056 B1 | * | 8/2001 | Jacobs et al. ................... | 710/48 |
| 6,412,075 B1 | * | 6/2002 | Klein .......................... | 713/322 |
| 6,711,631 B1 | * | 3/2004 | Chan et al. .................... | 710/14 |
| 6,763,400 B2 | * | 7/2004 | Numano et al. ................ | 710/14 |

(Continued)

FOREIGN PATENT DOCUMENTS

JP      06-231527       8/1994

(Continued)

OTHER PUBLICATIONS

English translation of JP 10-027411 A reference (Matshushita Electric Ind Co Ltd) Jan. 27, 1998.*

(Continued)

*Primary Examiner*—Suresh K Suryawanshi
(74) *Attorney, Agent, or Firm*—Westerman, Hattori, Daniels & Adrian, LLP

(57) ABSTRACT

An SCP (System Control Processor) 7 is provided in addition to a CPU 1 responsible for control of circuits in a computer. Upon receiving a Main ON signal (low level) indicative of the CPU 1 being inactive, the SCP 7 responds to a switch operation on a control panel 6 to supply a CD-ROM drive 2 with a command corresponding to the switch operation on said control panel 6 independently of the CPU 1 as well as to feed a high-level CD-POWER-ON signal to a power supply circuit 8 through an OR circuit 9. The power supply circuit 8 selectively supplies the CD-ROM drive 2 and an Audio amplifier 10 with driving power upon receiving the high-level signal.

10 Claims, 2 Drawing Sheets

U.S. PATENT DOCUMENTS 6,792,480 B2 * 9/2004 Chaiken et al. ............... 710/14

FOREIGN PATENT DOCUMENTS

| | | |
|---|---|---|
| JP | 07-153173 | 6/1995 |
| JP | 08-212679 | 8/1996 |
| JP | 10-027412 | 1/1998 |
| JP | 10-247411 | 1/1998 |
| JP | 10-092085 | 4/1998 |
| JP | 10-340517 | 12/1998 |
| JP | 2000-099211 | 4/2000 |

OTHER PUBLICATIONS

English translation of JP 10-027412, Shuji, Information processing device, Jan. 27, 1998.*

* cited by examiner

MULTIMEDIA ELECTRONIC DEVICE

TECHNICAL FIELD

The present invention relates to a multimedia electronic device comprising the function of reproducing a music CD or the like.

BACKGROUND ART

There is provided a personal computer comprising a recording medium reproducer such as a CD-ROM drive or a DVD (Digital Video Disc) drive. This type of recording medium reproducer is utilized for obtaining data for the computer. In recent years, however, it has been also used for reproducing a music CD, for example.

However, the conventional personal computer reproduces the music CD using application software run on an OS (Operating System) of a main CPU. Therefore, a circuit required for the personal computer to perform normal processing enters an approximately full-active state even at the time of mere music reproduction. Further, the main CPU must be booted up. Therefore, an initial set time period is required from the time when the main power supply is turned on until actual reproduction of music data is started.

JP-A-9-101848 discloses a small-sized multimedia information processing apparatus provided with a mode switch functioning exclusively as a CD player. The processing apparatus is so constructed that diagnosis and initialization processing for functioning as a personal computer are omitted to the utmost when the switch is turned on, and a device driver is started from a ROM. The apparatus stops the supply of power to a hard disk device or the like which is not required to reproduce a music CD when the mode switch is turned on.

In the conventional apparatus, however, the CPU performs light processing or inherent processing by turning the mode switch on or off. In either case, processing is performed by the CPU. When the music CD is reproduced in a state where the CPU enters a stop mode (an idle mode or a sleep mode) after it is booted up as an inherent personal computer, for example, therefore, the CPU becomes active again by releasing the stop mode.

DISCLOSURE OF INVENTION

A multimedia electronic device according to the present invention is characterized by comprising a CPU capable of controlling each of circuits, a reproducer for reading out information from a storage medium, a switch for operating the reproducer, an output circuit capable of outputting at least an audio signal on the basis of the information read out of the reproducer, and a controller receiving a signal representing the active state of the CPU and a signal representing the operating state of the switch for carrying out supply control of driving power to the reproducer and the output circuit and output control of a command to the reproducer on the basis of the two signals.

The controller monitors not only the operating state of the switch but also the active state of the CPU. Consequently, the controller can carry out such control as to output the command to the reproducer as well as to supply the reproducer and the output circuit with the driving power in place of the CPU under the condition that the switch is operated in a state where the CPU is inactive, for example. This means that a music CD or the like can be reproduced even if the CPU is not operated at all. The CPU enters, after being booted up as an inherent electronic device, a stop mode (an idle mode or a sleep mode). When the switch is operated in this state, the music CD can be reproduced without releasing the stop mode of the CPU.

A multimedia electronic device according to the present invention comprises a CPU capable of controlling each of circuits, a reproducer for reading out information from a storage medium, a switch provided for operating the reproducer, an output circuit capable of outputting at least an audio signal on the basis of the information read out of the reproducer, and a controller receiving a signal representing the active state of the CPU, a signal representing the operating state of the switch, and a signal representing the reproduction output state of the reproducer for carrying out supply control of driving power to the reproducer and the output circuit on the basis of the three signals.

The controller monitors the reproduction output state of the reproducer in addition to the operating state of the switch and the active state of the CPU. After the reproduction operation by the reproducer is terminated, therefore, such control can be carried out as to automatically stop the supply of driving power to the reproducer and the output circuit.

BEST MODE FOR CARRYING OUT THE INVENTION

First Embodiment

Figure 1:
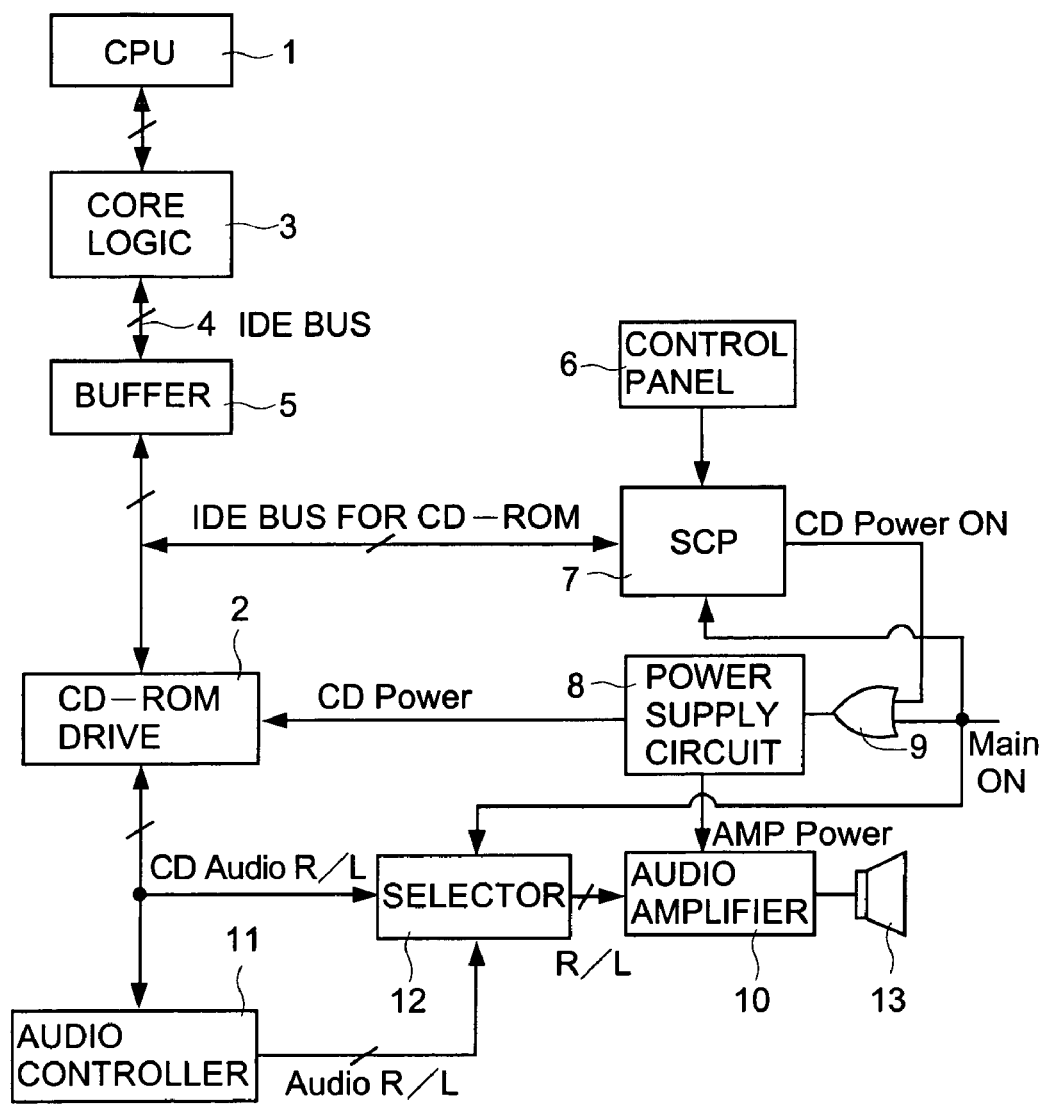
FIG. 1 is a block diagram showing a multimedia personal computer according to a first embodiment of the present invention.

A multimedia personal computer according to a first embodiment of the present invention will be described on the basis of FIG. 1. FIG. 1 is a block diagram showing main circuits in the personal computer.

A CPU (Central Processing Unit) constitutes a main controller responsible for control of each of the circuits in a personal computer. This is basically the same in the multimedia personal computer according to the present invention. That is, when the multimedia personal computer is operated as an inherent computer, the CPU 1 controls each of the circuits. For example, the CPU 1 controls a CD-ROM drive 2 on the basis of application software. In the control, a command is outputted to the CD-ROM drive 2 from core logic 3 of the CPU 1 via a buffer 5 on an IDE (Integrated Drive Electronics) bus 4.

In the multimedia personal computer (hereinafter referred to as multimedia computer) according to the present embodiment, a command corresponding to the CD-ROM drive 2 can be outputted from the CPU 1 on the basis of the application software, as described above, and can be also fed on the basis of the operation of a switch for music CD (a play, stop, fast forward, or rewind switch, etc.) provided in a control panel 6. Specifically, when the switch in the control panel 6 is operated, a switch operation signal is fed to an SCP (System Control Processor) 7 for music CD control. The SCP 7 can output a command to the CD-ROM drive 2 through the IDE bus 4 on the basis of the switch operation signal.

The SCP 7 receives a Main ON signal indicating whether or not the CPU 1 is being operated. The Main ON signal is at a high level when the CPU 1 is active, while being at a low level when the CPU 1 is inactive (idles or sleeps) or the power supply is turned off. The SCP 7 feeds, when the Main ON signal is at a low level, a high-level CD-POWER-ON signal to a power supply circuit 8 upon receipt of the switch operation signal. That is, even in a case where the CPU 1 is inactive or the power supply is turned off, if the switch in the control panel 6 is operated, the power supply circuit 8 becomes active. Accordingly, power is supplied to the CD-ROM drive 2 and an Audio amplifier 10 from the power supply circuit 8. Backup power is always supplied to the SCP 7. Accordingly, the SCP 7 can be operated even when the CPU 1 is supplied with no driving power.

The power supply circuit 8 receives the Main ON signal and the CD-POWER-ON signal through an OR circuit 9, and supplies the CD-ROM drive 2 and the Audio amplifier 10 with driving power when either one of the fed signals is at a high level.

The multimedia computer according to the present embodiment comprises an Audio controller 11 and a selector 12. The Audio controller 11 outputs a mixture (Audio R/L) of a reproduction signal (CD Audio R/L) reproduced by the CD-ROM drive 2 and another signal, as required. Examples of another signal include an audio signal produced by the CPU 1 and an audio signal separately inputted from a microphone or the like. Judgment whether or not the Audio controller 11 performs mixing is controlled by the CPU 1.

The selector 12 feeds either one of the reproduction signal (CD Audio R/L) and the signal (Audio R/L) from the Audio controller 11 to the Audio amplifier 10. Specifically, the selector 12 feeds the signal (Audio R/L) to the Audio amplifier 10 when the Main ON signal is at a high level, while feeding the reproduction signal (CD Audio R/L) to the Audio amplifier 10 when the Main ON signal is at a low level.

The operation of the multimedia computer according to the present embodiment will be described.

[When the CPU 1 is Active]

First, when the CPU 1 is active upon being supplied with a driving voltage, the Main ON signal is at a high level. Accordingly, the power supply circuit 8 supplies the CD-ROM drive 2 and the Audio amplifier 10 with the driving power irrespective of the operation of a switch for music CD in the control panel 6. At this time, the selector 12 feeds the signal (Audio R/L) from the Audio controller 11 to the Audio amplifier 10.

When the CPU 1 is active, therefore, the reproduction signal (CD Audio R/L) reproduced by the CD-ROM drive 2 is changed into the signal (Audio R/L) upon being mixed as required by the Audio controller 11. The signal (Audio R/L) is fed to the Audio amplifier 10, and is outputted as audio from the speaker 13.

At this time, examples of a command corresponding to the CD-ROM drive 2 include a command generated by the CPU 1 and a command generated by the SCP 7 in response to a switch operation on the control panel 6. The commands may collide with each other. As a method of solving such a problem, there are various methods: ① a method of the SCP 7 nullifying the switch operation on the control panel 6 when the Main ON signal is at a high level, ② a method of the SCP 7 monitoring the command outputted to the CD-ROM drive 2 from the CPU 1 through the IDE bus 4 and the SCP 7 outputting to the CD-ROM drive 2 the command corresponding to the switch operation on the control panel 6 while avoiding the collision of the commands, and ③ a method of the SCP 7 feeding to the CPU 1 information related to the switch operation on the control panel 6 and the CPU 1 outputting the command corresponding to the operation.

[When the CPU 1 is Inactive]

When the power supply is turned off or the CPU 1 is inactive, the Main ON signal is at a low level. The SCP 7 can be operated by backup power. The selector 12 is in such a selected state where the reproduction signal (CD Audio R/L) from the CD-ROM drive 2 is directly fed to the Audio amplifier 10.

In such a state, when the switch in the control panel 6 is operated, the SCP 7 first brings the CD-POWER-ON signal to a high level. Consequently, the power supply circuit 8 starts the supply of driving power to the CD-ROM drive 2 and the Audio amplifier 10 upon receipt of the high-level signal through the OR circuit 9. Further, the main ON signal is at a low level. Accordingly, the SCP 7 outputs the command corresponding to the switch operation on the control panel 6 to the CD-ROM drive 2 through the IDE bus 4. The reproduction signal (CD Audio R/L) reproduced in the CD-ROM drive 2 on the basis of the command from the SCP 7 is fed to the Audio amplifier 10 through the selector 12, and is outputted as audio from the speaker 13.

At this time, the buffer 5 electrically switches the IDE bus 4 from inactive circuits such as the CPU 1 and the core logic 3, to protect the circuits.

As described in the foregoing, when an objective is to only reproduce a music CD, for example, the driving power can be selectively supplied to the circuit required for only the reproduction. Accordingly, the entire multimedia computer need not be booted up, thereby making it possible to restrain useless power consumption. Further, the OS (CPU) need not be booted up. Accordingly, it is possible to shorten a time period required from the time when the power supply is turned on to reproduce the music CD or the like until the reproduction is actually started. That is, the music CD or the like can be reproduced even if the CPU 1 is not operated at all. Furthermore, when the CPU 1 enters a stop mode (an idle mode or a sleep mode) after being booted up as the inherent personal computer, even when the switch in the control panel 6 is operated in this state, the music CD or the like can be reproduced without releasing the stop mode of the CPU 1.

Second Embodiment

Figure 2:
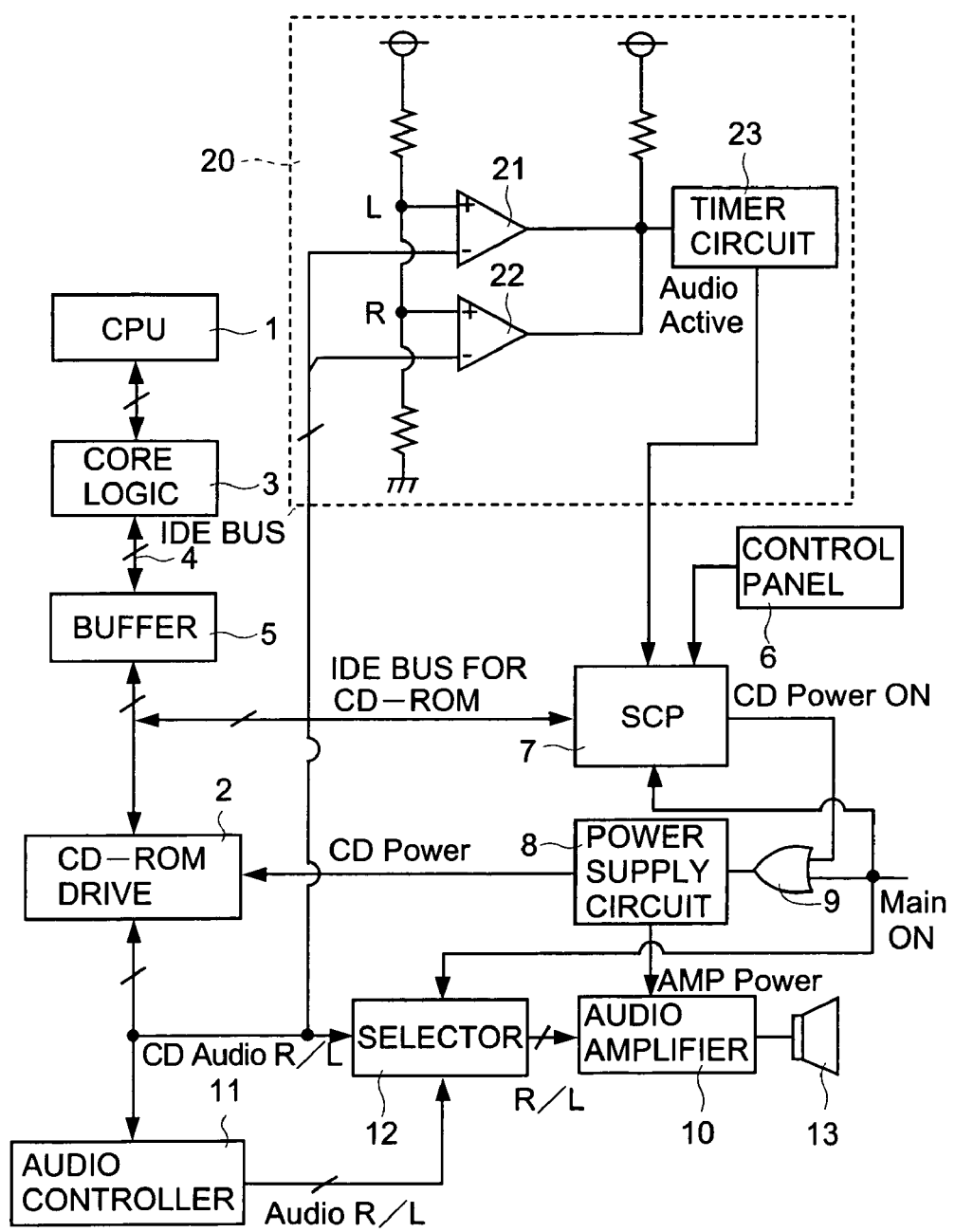
FIG. 2 is a block diagram showing a multimedia personal computer according to a second embodiment of the present invention.

A multimedia computer according to a second embodiment of the present invention will be described on the basis of FIG. 2 showing main circuits therein. The multimedia computer according to the present embodiment comprises the function in the embodiment 1, and further comprises the function of monitoring the reproduced state of a CD-ROM drive 2. The above-mentioned additional function shall be mainly described, to avoid redundancy by the overlapping of the description.

As shown in FIG. 2, the multimedia computer according to the present embodiment comprises a reproduction monitor 20. The reproduction monitor 20 has a first comparison circuit 21 for judging the presence or absence of a left channel reproduction signal outputted from the CD-ROM drive 2, a second comparison circuit 22 for judging the presence or absence of a right channel reproduction signal, and a timer circuit 23 for resetting the measurement of time on the basis of the results of comparison by both the comparison circuits 21 and 22.

The first and second comparison circuits 21 and 22 respectively receive right and left channel reproduction signals from the CD-ROM drive 2 and a reference voltage to make comparison, to output a low level if there is a reproduction signal, while outputting a high level if there is no reproduction signal. If there is no reproduction signal on both right and left channels, both outputs of the first and second comparison circuits 21 and 22 enter a high level, so that a timer circuit 23 receives a high level. The timer circuit 23 starts the measurement of time when its input is changed from a low level to a high level, to bring an Audio-Active signal into a high level when a predetermined time period has elapsed.

An SCP 7 is so constructed as to bring a CD-POWER-ON signal into a low level upon receipt of the high-level Audio-Active signal outputted from the reproduction monitor 20.

A power supply circuit 8 is so constructed as to be fed with a Main ON signal and a CD-POWER-ON signal through an OR circuit 9 and to supply a CD-ROM drive 2, an Audio amplifier 10, and a reproduction monitoring circuit 20 with driving power when either one of the fed signals is at a high level.

In such a configuration, when the reproduction operation of the CD-ROM drive 2 is terminated so that the output of the reproduction signal is stopped for a predetermined time period, the reproduction monitor 20 detects that the output of the reproduction signal is stopped, to feed the high-level Audio-Active signal to the SCP 7. As a result, the SCP 7 brings the CD-POWER-ON signal into a low level. Accordingly, the power supply circuit 8 stops the supply of the driving power to each of the circuits. After the reproduction operation of the CD-ROM drive 2 is terminated, power can be prevented from being uselessly consumed even if the multimedia computer is left as it is. The predetermined time period may be previously fixedly set in the multimedia computer, or may be arbitrarily settable by a user.

Although in the embodiment 1 and the embodiment 2, description was made of the reproduction of the CD, the embodiments can be also applied to the reproduction of another storage medium such as a DVD. In this case, the CD-ROM drive 2 may be merely replaced with a recording medium reproducer such as a DVD drive.

INDUSTRIAL APPLICABILITY

As described in the foregoing, a multimedia electronic device according to the present invention is useful for a power-saving electronic device.

The invention claimed is:

1. A multimedia electronic device, characterized by comprising a CPU capable of controlling each of circuits, a reproducer for reading out information from a storage medium, a switch for operating said reproducer, an output circuit capable of outputting at least an audio signal on the basis of the information read out of said reproducer, a controller receiving a signal representing the active state of said CPU, a signal representing the operating state of said switch, and a signal representing the reproduction output state of said reproducer for carrying out supply control of driving power to said reproducer and said output circuit on the basis of the three signals, characterized in that a signal representing the reproduction output state of said reproducer is outputted by a monitoring circuit comprising a detection circuit for detecting a reproduction output and a timer for outputting a signal indicating that a predetermined time period has elapsed since the reproduction output was not detected.

2. A multimedia electronic device, characterized by comprising a CPU capable of controlling each of circuits, a reproducer for reading out information from a storage medium, a switch for operating said reproducer, an output circuit capable of outputting at least an audio signal on the basis of the information read out of said reproducer, a controller receiving a signal representing the active state of said CPU, a signal representing the operating state of said switch, and a signal representing the reproduction output state of said reproducer for feeding a power supply control signal on the basis of the three signals, and a power supply circuit receiving said power supply control signal and a signal representing the active state of said CPU for supplying said reproducer and said output circuit with driving power when at least one of both the signals is active, characterized in that a signal representing the reproduction output state of said reproducer is outputted by a monitoring circuit comprising a detection circuit for detecting a reproduction output and a timer for outputting a signal indicating that a predetermined time period has elapsed since the reproduction output was not detected.

3. The multimedia electronic device according to claim 1 or 2, characterized in that the supply of the driving power of said monitoring circuit is controlled by said controller.

4. The multimedia electronic device according to claim 3 or 2, characterized in that said CPU is so constructed that it can out put a command to said reproducer on the basis of application software operating on an OS.

5. The multimedia electronic device according to claim 1 or 2, characterized in that said controller electrically switches said CPU and the reproducer when said CPU is inactive.

6. A multimedia electronic device, characterized by comprising a reproducer for reading out information from a storage medium, a switch for operating said reproducer, an output circuit capable of outputting at least an audio signal on the basis of information read out of said reproducer, a monitoring circuit for monitoring the reproduction output state of said reproducer, and a controller receiving a signal representing the operating state of said switch and a signal outputted by said monitoring circuit for controlling the supply of driving power to said reproducer and said output circuit on the basis of the two signals, said controller stopping the supply of the driving power to a predetermined circuit when said monitoring circuit detects that a reproduction output of said reproducer does not exist in a predetermined time period.

7. A multimedia electronic device, characterized by comprising a reproducer for reading out information from a storage medium, a switch for operating said reproducer, an output circuit capable of outputting at least an audio signal on the basis of the information read out of said reproducer, a monitoring circuit for monitoring the reproduction output state of said reproducer, and a controller receiving a signal representing the operating state of said switch and a signal outputted by said monitoring circuit for controlling the supply of driving power to said reproducer, said output circuit, and said monitoring circuit on the basis of the two signals, said controller stopping the supply of the driving power to a predetermined circuit when said monitoring circuit detects that a reproduction output of said reproducer does not exist in a predetermined time period.

8. A multimedia electronic device, characterized by comprising a reproducer for reading out information from a storage medium, a monitoring circuit for monitoring the reproduction output state of said reproducer, and a controller receiving a signal outputted by said monitoring circuit for controlling the supply of driving power to said reproducer on the basis of the signal, said controller stopping the supply of the driving power to a predetermined circuit when said monitoring circuit detects that a reproduction output of said reproducer does not exist in a predetermined time period.

9. A multimedia electronic device, characterized by comprising a reproducer for reading out information from a storage medium, a monitoring circuit for monitoring the reproduction output state of said reproducer, and a controller receiving a signal outputted by said monitoring circuit for controlling the supply of driving power to said reproducer and said monitoring circuit on the basis of the signal, said controller stopping the supply of the driving power to a predetermined circuit when said monitoring circuit detects that a reproduction output of said reproducer does not exist in a predetermined time period.

10. The multimedia electronic device according to any one of claims 6 to 9, characterized in that said controller stops the supply of the driving power to a predetermined circuit when said monitoring circuit detects that a reproduction output of said reproducer does not exist in a predetermined time period.

* * * * *